(12) United States Patent
Hart et al.

(10) Patent No.: US 8,353,801 B2
(45) Date of Patent: Jan. 15, 2013

(54) MULTI-SPEED TRANSMISSION

(75) Inventors: James M. Hart, Belleville, MI (US); Andrew W. Phillips, Rochester, MI (US); Edward W. Mellet, Rochester Hills, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 214 days.

(21) Appl. No.: 12/987,799

(22) Filed: Jan. 10, 2011

(65) Prior Publication Data
US 2012/0178579 A1 Jul. 12, 2012

(51) Int. Cl.
*F16H 3/62* (2006.01)
(52) U.S. Cl. ......... 475/276; 475/279; 475/280; 475/290
(58) Field of Classification Search ................ 475/276, 475/279, 280, 290
See application file for complete search history.

(56) References Cited

U.S. PATENT DOCUMENTS

| | | | |
|---|---|---|---|
| 6,176,803 B1 | 1/2001 | Meyer et al. | |
| 6,984,187 B2 | 1/2006 | Biermann | |
| 2012/0178572 A1* | 7/2012 | Hart | 475/269 |
| 2012/0178578 A1* | 7/2012 | Mellet et al. | 475/275 |
| 2012/0178579 A1* | 7/2012 | Hart et al. | 475/271 |
| 2012/0178580 A1* | 7/2012 | Wittkopp et al. | 475/275 |
| 2012/0178581 A1* | 7/2012 | Wittkopp et al. | 475/275 |
| 2012/0178582 A1* | 7/2012 | Wittkopp et al. | 475/276 |
| 2012/0214632 A1* | 8/2012 | Mellet et al. | 475/276 |
| 2012/0214635 A1* | 8/2012 | Mellet et al. | 475/276 |
| 2012/0214637 A1* | 8/2012 | Hart et al. | 475/276 |
| 2012/0214638 A1* | 8/2012 | Hart et al. | 475/276 |
| 2012/0225747 A1* | 9/2012 | Carey et al. | 475/276 |

\* cited by examiner

*Primary Examiner* — David D Le
*Assistant Examiner* — Derek D Knight

(57) ABSTRACT

The present invention provides a multiple speed automatic transmission having an input member, an output member and four planetary gear assemblies each including a sun gear, a planet gear carrier with a plurality of planet gears and a ring gear. The transmission also includes four friction brakes and two friction clutches. The transmission further includes a plurality of fixed or rigid connections. A first connection couples the ring gear of the first planetary gear assembly to the sun gear of the second planetary gear assembly. A second connection couples the planet gear carrier of the first planetary gear assembly to the planet gear carrier of the second planetary gear assembly. A third connection couples the ring gear of the third planetary gear assembly to the sun gear of the fourth planetary gear assembly. A fourth connection couples the planet gear carrier of the third planetary gear assembly to the planet gear carrier of the fourth planetary gear assembly. A fifth connection couples the ring gear of the second planetary gear assembly to the sun gear of the third planetary gear assembly.

20 Claims, 3 Drawing Sheets

| GEAR STATE | BRAKES | | | | CLUTCHES | |
|---|---|---|---|---|---|---|
| | 62 | 64 | 66 | 68 | 74 | 72 |
| REV | X | | | X | | |
| N | | | | O | | |
| 1ST | | X | | X | | |
| 2ND | | | | X | | X |
| 3RD | | X | | | | X |
| 4TH | | | X | | | X |
| 5TH | X | | | | | X |
| 6TH | | | | | X | X |
| 7TH | X | | | | X | |
| 8TH | | | X | | X | |
| 9TH | | X | | | X | |

X = ON - ENGAGED CARRYING TORQUE
O = ON - ENGAGED NOT CARRYING TORQUE

MULTI-SPEED TRANSMISSION

FIELD

The present disclosure relates to a multiple speed automatic transmission and more particularly to a nine speed automatic transmission having four planetary gear assemblies.

BACKGROUND

The statements in this section merely provide background information related to the present disclosure and may or may not constitute prior art.

A typical modern multiple speed automatic transmission includes a plurality of planetary gear assemblies and selectively engaged friction clutches and brakes that achieve a plurality of forward speeds or gear ratios and reverse.

Increasingly demanding economic, performance and efficiency goals continue to encourage automatic transmission research and development. A result of this effort has been a steady increase in the number of available forward speeds or gear ratios in an automatic transmission.

Whereas four or five speed automatic transmissions were once commonplace and considered to provide sufficient operating flexibility and performance, the industry and consumer preference has moved to six, seven and eight speed automatic transmissions.

In such transmissions, the elements of a plurality of planetary gear assemblies are (1) connected by permanent coupling members, (2) selectively connected by friction clutches or (3) selectively grounded by brakes. Specific combinations of the clutches and brakes are engaged or activated in sequence to provide a predetermined sequence of numerically related gear ratios and thus output speeds and torques.

Because they so closely match the power and torque outputs of an engine to vehicle speed and load, six, seven and eight speed automatic transmissions provide significant performance enhancements and fuel consumption reduction. Nonetheless, such transmissions are known to have drawbacks. Two known and related drawbacks are complexity and cost. A corollary to such complexity is frictional loss. Each of the torque transmitting devices, namely, the clutches and brakes, contributes to frictional losses, referred to as spin losses, when they are not engaged. Three primary factors influence overall transmission spin losses: the total number of clutches and brakes, the size or torque capacity of the clutch or brake and the instantaneous speed difference between the input and output of the clutch or brake.

Because of their benefits and in spite of their drawbacks, there is ongoing and increasing demand for automatic transmissions having more than eight forward gears or speed ratios. The present invention provides an automatic transmission having nine forward speeds or gear ratios and reverse and one which exhibits reduced frictional losses.

SUMMARY

The present invention provides a multiple speed automatic transmission. The automatic transmission includes an input shaft or member, an output shaft or member, and four planetary gear assemblies each including a sun gear, a planet gear carrier with a plurality of planet gears and a ring gear. The input shaft or member is coupled to the sun gear of the second planetary gear assembly and the output shaft is coupled to the planet gear carrier of the third planetary gear assembly. The transmission also includes six torque transmitting devices: four friction brakes and two friction clutches.

The transmission further includes a plurality of fixed or rigid connections between the various components. A first connection couples the ring gear of the first planetary gear assembly to the sun gear of the second planetary gear assembly. A second connection couples the planet gear carrier of the first planetary gear assembly to the planet gear carrier of the second planetary gear assembly. A third connection couples the ring gear of the third planetary gear assembly to the sun gear of the fourth planetary gear assembly. A fourth connection couples the planet gear carrier of the third planetary gear assembly to the planet gear carrier of the fourth planetary gear assembly. A fifth connection couples the ring gear of the second planetary gear assembly to the sun gear of the third planetary gear assembly. A sixth connection couples the sun gear of the first planetary gear assembly to the first brake and a seventh connection couples the second clutch to the ring gear of the fourth planetary gear assembly. In certain embodiments, because of the layout of the planetary gear assemblies, one or more of the connections are achieved by an integral or common component, thereby essentially eliminating a shaft, quill or other member.

Thus it is an aspect of the present invention to provide a multiple speed automatic transmission.

It is a further aspect of the present invention to provide a nine speed automatic transmission.

It is a still further aspect of the present invention to provide an automatic transmission having four planetary gear assemblies.

It is a still further aspect of the present invention to provide an automatic transmission having six torque transmitting devices.

It is a still further aspect of the present invention to provide an automatic transmission having four friction brakes and two friction clutches.

It is a still further aspect of the present invention to provide an automatic transmission having a plurality of fixed connections between components of the transmission.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4:
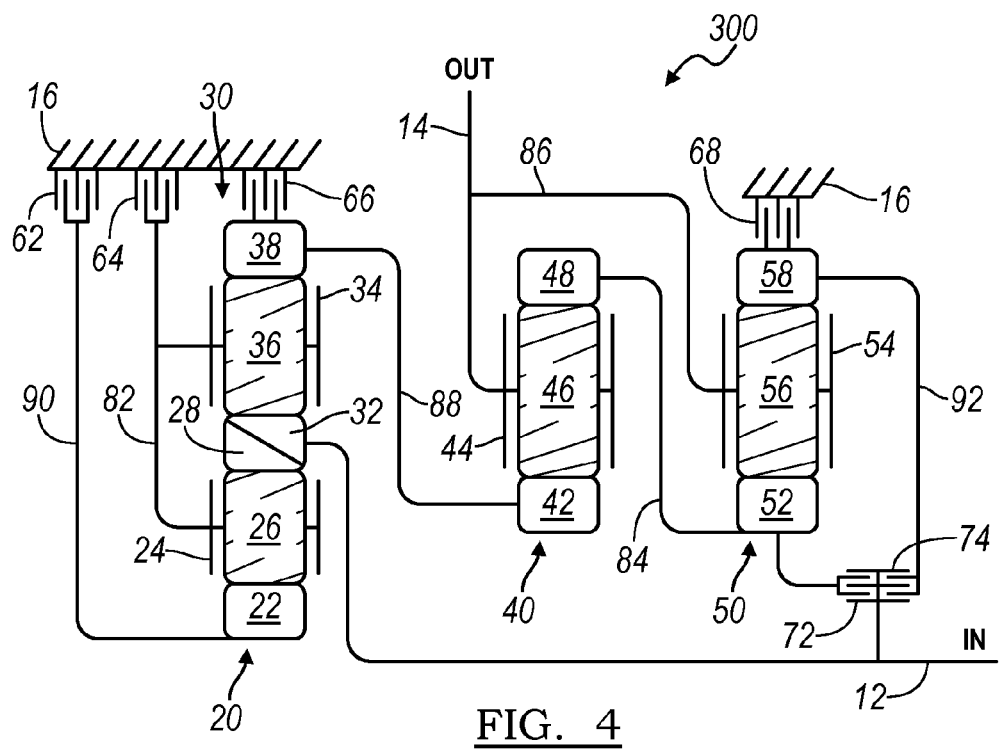
Figures 5, 6:
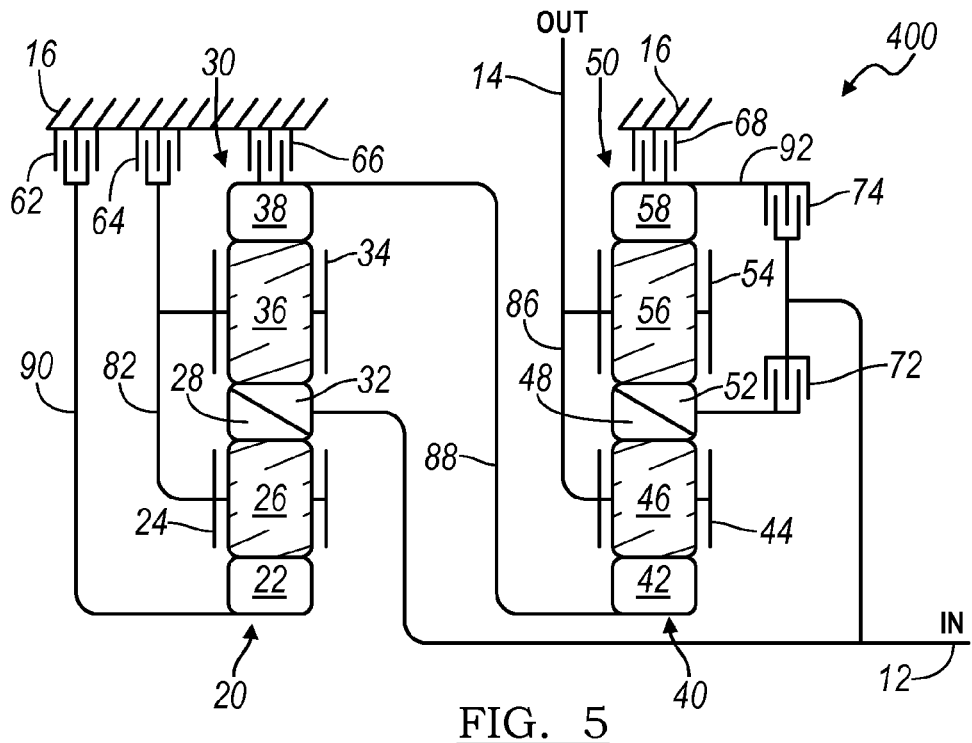

FIG. 4 is a stick diagram of a third embodiment of a nine speed automatic transmission according to the present invention; and FIG. 5 is a stick diagram of a fourth embodiment of a nine speed automatic transmission according to the present invention; and FIG. 6 is a truth table presenting the various combinations of engaged brakes and clutches which achieve a given forward or reverse gear or speed ratio and provide nine forward speeds and reverse in a nine speed automatic transmission according to the present invention.

DETAILED DESCRIPTION

The following description is merely exemplary in nature and is not intended to limit the present disclosure, application, or uses.

Figure 1:
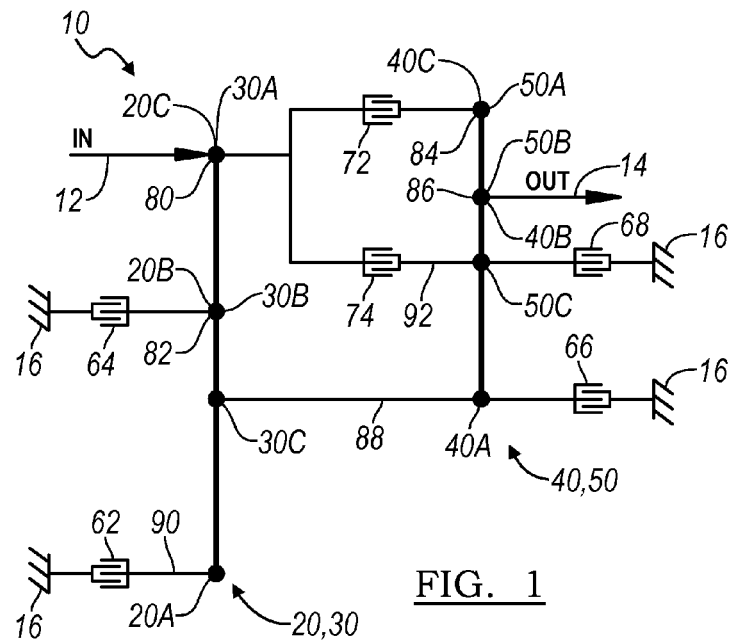
FIG. 1 is a lever diagram of a nine speed automatic transmission according to the present invention.

With reference to FIG. 1, a multiple, i.e., nine, speed automatic transmission 10 according to the present invention is illustrated in a lever diagram. A lever diagram is a schematic representation of the components of an automatic transmission wherein a planetary gear assembly is represented by a vertical bar or lever and the components of the planetary gear assemblies such as sun gears, planet gear carriers and ring gears are represented by nodes. The relative lengths of the vertical bars between the nodes represent the ratios between the components. Where a component of one planetary gear assembly is coupled directly to a component of another planetary gear assembly, two levers may be combined into a single lever having, in this instance, four nodes. Because of such direct coupling, the four planetary gear assemblies of the present invention are represented by only two vertical bars or levers. Mechanical couplings or interconnections between the nodes of the planetary gear assemblies are also represented by horizontal lines and torque transmitting devices such as friction clutches and brakes are represented by interleaved or nested fingers. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The multiple speed automatic transmission 10 includes an input shaft or member 12 which receives drive torque, an output shaft or member 14 which provides drive torque and a housing 16 which is referred to as "ground" with reference to FIG. 1. The automatic transmission 10 also includes four planetary gear assemblies. A first planetary gear assembly 20 includes a first node 20A, a second node 20B and a third node 20C which is coupled to and driven by the input shaft or member 12. A second planetary gear assembly 30 includes a first node 30A which is common with the third node 20C of the first planetary gear assembly 20 and thus is also driven by the input shaft or member 12, a second node 30B which is common with the second node 20B of the first planetary gear assembly 20 and a third node 30C. A third planetary gear assembly 40 includes a first node 40A, a second node 40B which is coupled to and drives the output shaft or member 14 and a third node 40C. Finally, a fourth planetary gear assembly 50 includes a first node 50A which is common with the third node 40C of the fourth planetary gear assembly 40, a second node 50B which is common with the second node 40B of the third planetary gear assembly 40 and thus also drives the output shaft or member 14 and a third node 50C.

Additionally, the automatic transmission 10 includes a plurality of selectively engageable torque transmitting devices, namely, friction brakes and friction clutches. As utilized herein, the term "friction brake" refers to any torque transmitting device having a first plurality of rotatable friction plates or discs which are interleaved with a second, stationary plurality of plates or discs and which are compressed by an associated operator or actuator to ground or brake the rotating plates or discs to the housing 16. The term "friction clutch" refers to a similar device in which the first and second pluralities of interleaved friction plates or discs transmit torque between two rotatable members. It should be understood, however, that other clutch types and configurations are within the purview of this invention.

A first friction brake 62 is operably disposed between the first node 20A of the first planetary gear assembly 20 and ground (the housing 16). A second friction brake 64 is operably disposed between the second node 20B of the first planetary gear assembly 20 (and the second node 30B of the second planetary gear assembly 30) and ground (the housing 16). A third friction brake 66 is operably disposed between the first node 40A of the third planetary gear assembly 40 and ground (the housing 16). A fourth friction brake 68 is operably disposed between the third node 50C of the fourth planetary gear assembly 50 and ground (the housing 16).

A first friction clutch 72 is operably disposed between the first node 30A of the second planetary gear assembly 30 and the third node 40C of the third planetary gear assembly 40 (and the first node 50A of the fourth planetary gear assembly 50). A second friction clutch 74 is operably disposed between the first node 30A of the second planetary gear assembly 30 and the third node 50C of the fourth planetary gear assembly 50.

Figure 2:
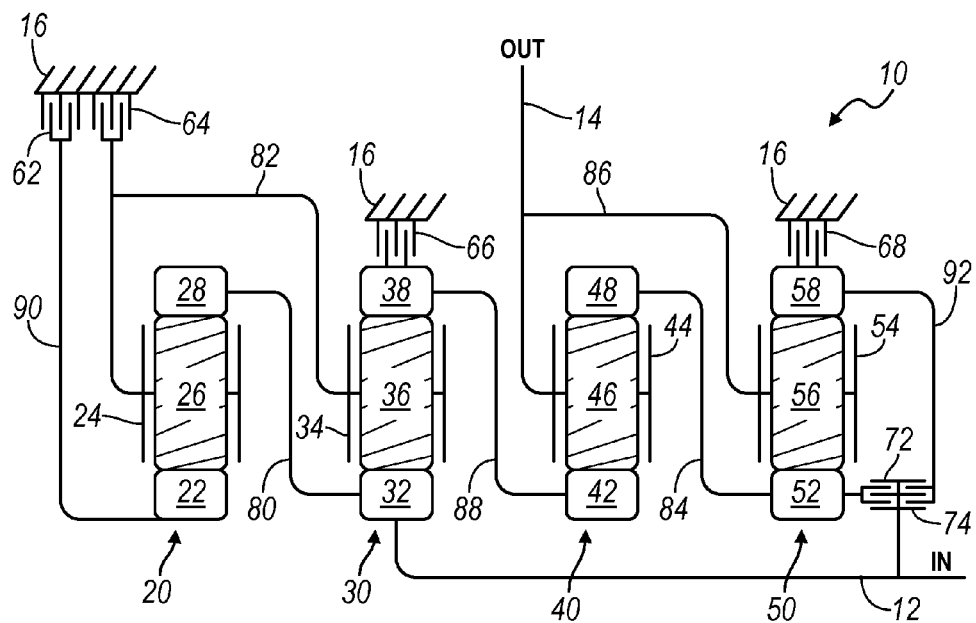
FIG. 2 is a stick diagram of a first embodiment of a nine speed automatic transmission according to the present invention.

Referring now to FIGS. 1 and 2, there are also a plurality of fixed, i.e., positive or direct, connections or couplings between various components of the planetary gear assemblies 20, 30, 40 and 50. Because the first planetary gear assembly 20 and the second planetary gear assembly 30 are combined in a single lever in FIG. 1 and the third planetary gear assembly 40 and the fourth planetary gear assembly 50 are also combined in a single lever in FIG. 1, many of the fixed connections are contained within or are integral components of certain nodes. Accordingly, many of the fixed connections are only clearly visible in FIG. 2.

A first shaft, quill or member 80, which may be an extension of the input shaft 12, connects the third node 20C of the first planetary gear assembly 20 to the first node 30A of the second planetary gear assembly 30. A second shaft, quill or member 82 connects the second node 20B of the first planetary gear assembly 20 to the second node 30B of the second planetary gear assembly 30. A third shaft, quill or member 84 connects the third node 40C of the third planetary gear assembly 40 to the first node 50A of the fourth planetary gear assembly 50. A fourth shaft, quill or member 86, which may be an extension of the output shaft 14, connects the second node 40B of the third planetary gear assembly 40 to the second node 50B of the fourth planetary gear assembly 50. A fifth shaft, quill or member 88 connects the third node 30C of the second planetary gear assembly 30 to the first node 40A of the third planetary gear assembly 40. Because of the layout of the components in the first embodiment of the automatic transmission 10, two additional fixed connections such as shafts, quills or members may be utilized. A sixth shaft, quill or member 90 connects the first friction brake 62 to the first node 20A of the first planetary gear assembly 20 and a seventh shaft, quill or member 92 connects the third node 50C of the fourth planetary gear assembly 50 to the second friction clutch 74.

In FIG. 2, the levers have been replaced by four simple planetary gear assemblies 20, 30, 40, and 50 and the nodes 20A, 20B, 20C, 30A, 30B, 30C, 40A, 40B, 40C, 50A, 50B and 50C have been replaced by the components of the planetary gear assemblies: sun gears, planetary gear carriers having planet gears and ring gears. Thus, the first planetary gear assembly 20 includes a first sun gear 22, a first planet gear carrier 24 and a first ring gear 28. Rotatably disposed in the first planet gear carrier 24 are a first plurality of planet gears 26, one of which is illustrated in FIG. 2. Each of the first plurality of planet gears 26 is in constant mesh with the first sun gear 22 and the first ring gear 28. The second planetary gear assembly 30 includes a second sun gear 32, a second planet gear carrier 34 and a second ring gear 38. Rotatably disposed in the second planet gear carrier 34 on stub shafts and/or bearings (not illustrated) are a plurality of second planet gears 36, one of which is illustrated in FIG. 2. Each of the plurality of second planet gears 36 is in constant mesh with the second sun gear 32 and the second ring gear 38.

The third planetary gear assembly 40 includes a third sun gear 42, a third planet gear carrier 44 and a third ring gear 48. Rotatably disposed in the third planet gear carrier 44 on stub shafts and/or bearings (not illustrated) are a plurality of third planet gears 46, one of which is illustrated in FIG. 2. Each of the plurality of third planet gears 46 is in constant mesh with the third sun gear 42 and the third ring gear 48. The fourth planetary gear assembly 50 includes a fourth sun gear 52, a fourth planet gear carrier 54 and a fourth ring gear 58. Rotatably disposed in the fourth planet gear carrier 54 on stub shafts and/or bearings (not illustrated) are a plurality of fourth planet gears 56, one of which is illustrated in FIG. 2. Each of the plurality of fourth planet gears 56 is in constant mesh with the fourth sun gear 52 and the fourth ring gear 58.

The first friction brake 62 is connected between the housing 16 and the first sun gear 22 of the first planetary gear assembly 20 by the sixth shaft, quill or member 90. The second friction brake 64 is connected between the housing 16 and the first planet gear carrier 24 of the first planetary gear assembly 20 and the second planet gear carrier 34 of the second planetary gear assembly 30 by the second shaft, quill or member 82. The third friction brake 66 is connected between the housing 16 and the second ring gear 38 of the second planetary gear assembly 30 and the third sun gear 42 of the third planetary gear assembly 40 by the fifth shaft, quill or member 88. The fourth friction brake 68 is connected between the housing 16 and the fourth ring gear 58 of the fourth planetary gear assembly 50.

The first friction clutch 72 is connected between the input shaft 12 and the second sun gear 32 of the second planetary gear assembly 30 and the fourth sun gear 52 of the fourth planetary gear assembly 50 and the third ring gear 48 of the third planetary gear assembly 40 by the third shaft, quill or member 84. The second friction clutch 74 is connected between the input shaft 12 and the second sun gear 32 of the second planetary gear assembly 30 and the fourth ring gear 58 of the fourth planetary gear assembly 50 by the seventh shaft, quill or member 92.

The first shaft, quill or member 80 connects the first ring gear 28 of the first planetary gear assembly 20 to the second sun gear 32 of the second planetary gear assembly 30. The fourth shaft, quill or member 86 which may be an extension of the output shaft 16 connects the third planet gear carrier 44 of the third planetary gear assembly 40 to the fourth planet gear carrier 54 of the fourth planetary gear assembly 50.

Figure 3:
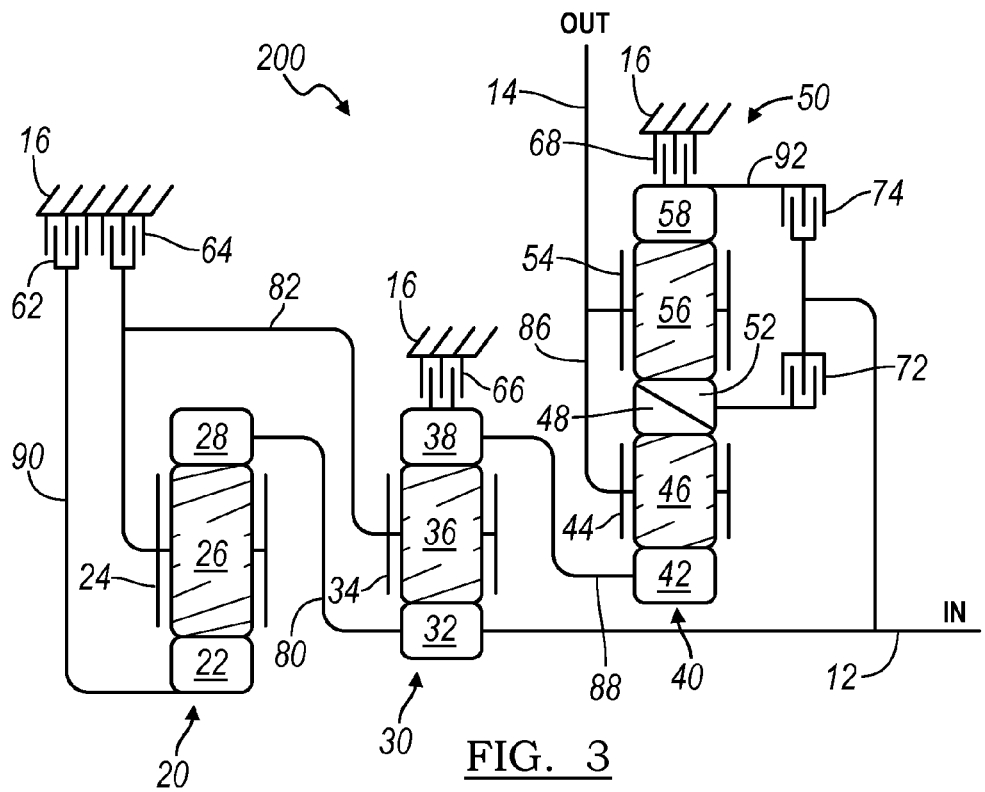
FIG. 3 is a stick diagram of second embodiment of a nine speed automatic transmission according to the present invention.

Referring now to FIG. 3, a second embodiment of the automatic transmission 10 is illustrated in a stick diagram and generally designated by the reference number 200. Although the lever diagram of FIG. 1 applies to the second embodiment automatic transmission 200, the layout of the components is somewhat different than the first embodiment automatic transmission 10. The second embodiment automatic transmission 200 includes the first planetary gear assembly 20, the second planetary gear assembly 30, the third planetary gear assembly 40 and the fourth planetary gear assembly 50. It also includes the first friction brake 62, the second friction brake 64, the third friction brake 66, the fourth friction brake 68, the first friction clutch 72 and the second friction clutch 74.

Additionally, the second embodiment of the automatic transmission 200 includes the input shaft 12, the output shaft 14, the housing 16, the first shaft, quill or member 80, the second shaft, quill or member 82, the fourth shaft, quill or member 86, the fifth shaft, quill of member 88, the sixth shaft, quill or member 90 and the seventh shaft, quill or member 92. Because of the stacked arrangement of the third planetary gear assembly 40 and the fourth planetary gear assembly 50 and the common (or proximate) third ring gear 48 of the third planetary gear assembly 40 with the fourth sun gear 52 of the fourth planetary gear assembly 50, the third shaft, quill or member 84 is essentially eliminated.

Referring now to FIG. 4, a third embodiment of the automatic transmission 10 is illustrated in a stick diagram and generally designated by the reference number 300. While the lever diagram of FIG. 1 applies to the third embodiment of the automatic transmission 300, the layout of the components is somewhat different than the layout of the components in the first embodiment automatic transmission 10 and the second embodiment automatic transmission 200. The third embodiment of the automatic transmission 300 includes the first planetary gear assembly 20, the second planetary gear assembly 30, the third planetary gear assembly 40 and the fourth planetary gear assembly 50. It also includes the first friction brake 62, the second friction brake 64, the third friction brake 66, the fourth friction brake 68, the first friction clutch 72 and the second friction clutch 74.

Additionally, the third embodiment of the automatic transmission 300 includes the input shaft 12, the output shaft 14, the housing 16, the second shaft, quill or member 82, the third shaft, quill or member 84, the fourth shaft, quill or member 86, the fifth shaft, quill of member 88, the sixth shaft, quill or member 90 and the seventh shaft, quill or member 92. Because of the stacked arrangement of the first planetary gear assembly 20 and the second planetary gear assembly 30 and the common (or proximate) first ring gear 28 of the first planetary gear assembly 20 with the second sun gear 32 of the second planetary gear assembly 30, the first shaft, quill or member 80 is essentially eliminated.

Referring now to FIG. 5, a fourth embodiment of the automatic transmission 10 is illustrated in a stick diagram and generally designated by the reference number 400. Again, the lever diagram of FIG. 1 applies to the fourth embodiment of the automatic transmission 400, but the layout of the components is different from the layout of the components in the first embodiment automatic transmission 10, the second embodiment automatic transmission 200 and the third embodiment automatic transmission 300. The fourth embodiment of the automatic transmission 400 is essentially a combination of the stacked arrangement of the third planetary gear assembly 40 and the fourth planetary gear assembly 50 of the second embodiment of the automatic transmission 200 with the stacked arrangement of the first planetary gear assembly 20 and the second planetary gear assembly 30 of the third embodiment of the automatic transmission 300.

The fourth embodiment of the automatic transmission 400 includes the first planetary gear assembly 20, the second planetary gear assembly 30, the third planetary gear assembly 40 and the fourth planetary gear assembly 50. It also includes the first friction brake 62, the second friction brake 64, the third friction brake 66, the fourth friction brake 68, the first friction clutch 72 and the second friction clutch 74. Additionally, the fourth embodiment of the automatic transmission 400 includes the input shaft 12, the output shaft 14, the housing 16, the second shaft, quill or member 82, the fourth shaft, quill or member 86, the fifth shaft, quill of member 88, the sixth shaft, quill or member 90 and the seventh shaft, quill or member 92.

Because of the stacked or paired arrangement of the planetary gear assemblies 20 and 30 and 40 and 50, two shafts, quills or members can essentially be eliminated. The second planetary gear assembly 30 and the first planetary gear assembly 20 are stacked and the first ring gear 28 of the first planetary gear assembly is common, integral or proximate with the second sun gear 32 of the second planetary gear assembly 30 thereby essentially eliminating the first shaft, quill or member 80. Likewise, the fourth planetary gear assembly 50 and the third planetary gear assembly 40 are stacked and the third ring gear 48 of the third planetary gear assembly 40 is common, integral or proximate the fourth sun gear 52 of the fourth planetary gear assembly 50, thereby essentially eliminating the third shaft, quill or member 84.

Referring now to FIG. 6, the sequence of operation, i.e., the activation or engagement, of the six torque transmitting devices, which provides nine forward speeds or gear ratios and reverse is illustrated. FIG. 6 is a truth table which presents the various combinations of brakes and clutches that are activated or engaged to achieve nine forward speeds and reverse. An "X" appearing in a column indicates activation or engagement if the subject brake or clutch and that the device is carrying torque. An "O" appearing in a column indicates that the subject brake or clutch is activated or engaged but that it is not carrying torque. No entry in a column indicates that the subject brake or clutch is inactive or disengaged. The actual gear ratios and ratio steps may be adjusted or varied over significant ranges to accommodate various applications and operational criteria of the automatic transmissions 10, 200, 300 and 400.

To engage reverse, referred to in FIG. 6 as "Rev," the first friction brake 62 and the fourth friction brake 68 are engaged or activated. In neutral, referred to by the letter "N" in FIG. 6, only the fourth friction brake 68 is engaged or activated but it is not carrying torque.

First gear is achieved by activating or engaging the second friction brake 64 while maintaining activation or engagement of the fourth friction brake 68. Second gear is achieved by deactivating or disengaging the second friction brake 64 and activating or engaging the first friction clutch 72 while maintaining activation or engagement of the fourth friction brake 68.

Third gear is achieved by deactivating or disengaging the fourth friction brake 68 and engaging or activating the second friction brake 64 while maintaining activation or engagement of the first friction clutch 72. Fourth gear is achieved by deactivating or disengaging the second friction brake 64 and engaging or activating the third friction brake 66 while maintaining engagement of the first friction clutch 72.

Fifth gear is achieved by deactivating or disengaging the third friction brake 66 and engaging or activating the first friction brake 62 while maintaining engagement of the first friction clutch 72. Sixth gear is achieved by deactivating or disengaging the first friction brake 62 and engaging or activating the second friction clutch 74 while maintaining engagement of the first friction clutch 72.

Seventh gear is achieved by deactivating or disengaging the first friction clutch 72 and engaging or activating the first friction brake 62 while maintaining engagement of the second friction clutch 74. Eighth gear is achieved by deactivating or disengaging the first friction brake 62 and engaging or activating the third friction brake 66 while maintaining engagement of the second friction clutch 74. Ninth gear is achieved by deactivating or disengaging the third friction brake 66 and activating or engaging the second friction brake 64 while maintaining engagement of the second friction clutch 74.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiple speed automatic transmission comprising, in combination,
   a first planetary gear assembly, a second planetary gear assembly, a third planetary gear assembly and a fourth planetary gear assembly, each of said planetary gear assemblies having three members,
   an input member connected to one of said members of said second planetary gear assembly,
   an output member connected to one of said members of said third planetary gear assembly,
   a first member for connecting said one of said members of said first planetary gear assembly with said one of said members of said second planetary gear assembly,
   a second member for connecting another of said members of said first planetary gear assembly with another of said members of said second planetary gear assembly,
   a third member for connecting another of said members of said third planetary gear assembly with one of said members of said fourth planetary gear assembly,
   a fourth member for connecting said one of said members of said third planetary gear assembly with another of said members of said fourth planetary gear assembly,
   a fifth member for connecting yet another of said members of said second planetary gear assembly with yet another of said members of said third planetary gear assembly, and
   a plurality of torque transmitting devices selectively engageable to connect: yet another of said members of said first planetary gear assembly to ground, said another of said members of said first planetary gear assembly and said another of said members of said second planetary gear assembly to ground, said yet another of said members of said second planetary gear assembly to ground, yet another of said members of said fourth planetary gear assembly to ground, said input shaft to said one of said members of said fourth planetary gear assembly and said input shaft to said yet another of said members of said fourth planetary gear assembly.

2. The multiple speed automatic transmission of claim 1 wherein a first group of said plurality of torque transmitting devices are brakes and a second group of said plurality of torque transmitting devices are clutches.

3. The multiple speed automatic transmission of claim 1 wherein said one member of said first planetary gear assembly is a ring gear, said another member of said first planetary gear assembly is a planet gear carrier and said yet another member of said first planetary gear assembly is a sun gear.

4. The multiple speed automatic transmission of claim 1 wherein said one member of said second planetary gear assembly is a sun gear, said another member of said second planetary gear assembly is a planet gear carrier and said yet another member of said second planetary gear assembly is a ring gear.

5. The multiple speed automatic transmission of claim 1 wherein said one member of said third planetary gear assembly is a planet gear carrier, said another member of said third planetary gear assembly is a ring gear and said yet another member of said third planetary gear assembly is a sun gear.

6. The multiple speed automatic transmission of claim 1 wherein said one member of said fourth planetary gear assembly is a sun gear, said another member of said fourth planetary gear assembly is a planet gear carrier and said yet another member of said fourth planetary gear assembly is a ring gear.

7. The multiple speed automatic transmission of claim 1 wherein each of said three members of said first, second, third and fourth planetary gear assemblies is one of a sun gear, a ring gear and a planet gear carrier.

8. A multiple speed automatic transmission comprising, in combination,
an input shaft and an output shaft,
a first planetary gear assembly, a second planetary gear assembly, a third planetary gear assembly and a fourth planetary gear assembly, each of said planetary gear assemblies having a sun gear, a plurality of planet gears disposed in a planet gear carrier and a ring gear,
a plurality of torque transmitting devices including a first brake, a second brake, a third brake, a fourth brake, a first clutch and a second clutch,
said input shaft connected to said sun gear of said second planetary gear assembly, said first clutch, said second clutch and said ring gear of said first planetary gear assembly through a first member,
said output shaft connected to said planet gear carrier of said third planetary gear assembly and said planet gear carrier of said fourth planetary gear assembly through a fourth member,
a second member connecting said second brake to said planet gear carrier of said first planetary gear assembly and said planet gear carrier of said second planetary gear assembly, a third member connecting said ring gear of said third planetary gear assembly to said sun gear of said fourth planetary gear assembly, a fifth member connecting said ring gear of said second planetary gear assembly to said sun gear of said third planetary gear assembly, a sixth member connecting said first brake to said sun gear of said first planetary gear assembly and a seventh connecting member connecting said ring gear of said fourth planetary gear assembly to said second clutch.

9. The multiple speed automatic transmission of claim 8 further including a housing.

10. The multiple speed automatic transmission of claim 9 wherein said brakes include an element connected to said housing.

11. The multiple speed automatic transmission of claim 8 wherein said third member is an integral connection between said ring gear of said third planetary gear assembly and said sun gear of said fourth planetary gear assembly.

12. The multiple speed automatic transmission of claim 8 wherein said first member is an integral connection between said ring gear of said first planetary gear assembly and said sun gear of said second planetary gear assembly.

13. The multiple speed automatic transmission of claim 8 wherein said first member is an integral connection between said ring gear of said first planetary gear assembly and said sun gear of said second planetary gear assembly and said third member is an integral connection between said ring gear of said third planetary gear assembly and said sun gear of said fourth planetary gear assembly.

14. The multiple speed automatic transmission of claim 8 wherein selective engagement of said brakes and said clutches provides nine forward gear ratios and reverse.

15. An automatic transmission comprising, in combination,
an input shaft,
an output shaft,
a first planetary gear assembly, a second planetary gear assembly, a third planetary gear assembly and a fourth planetary gear assembly, each of said planetary gear assemblies having a sun gear, a plurality of planet gears disposed in a planet gear carrier and a ring gear,
a first friction brake, a second friction brake, a third friction brake, a fourth friction brake, a first friction clutch and a second friction clutch,
said input shaft connected to said sun gear of said second planetary gear assembly, said first friction clutch and said second friction clutch,
said output shaft connected to said planet gear carrier of said third planetary gear assembly,
a first member connecting said ring gear of said first planetary gear assembly to said sun gear of said second planetary gear assembly, a second member connecting said second brake to said planet gear carrier of said first planetary gear assembly and said planet gear carrier of said second planetary gear assembly, a third member connecting said ring gear of said third planetary gear assembly to said sun gear of said fourth planetary gear assembly, a fourth member connecting said planet carrier of said third planetary gear assembly to said planet gear carrier of said fourth planetary gear assembly, a fifth member connecting said ring gear of said second planetary gear assembly to said sun gear of said third planetary gear assembly, a sixth member connecting said first brake to said sun gear of said first planetary gear assembly and a seventh connecting member connecting said ring gear of said fourth planetary gear assembly to said second clutch.

16. The automatic transmission of claim 15 wherein said first member is a direct connection between said ring gear of said first planetary gear assembly and said sun gear of said second planetary gear assembly.

17. The automatic transmission of claim 15 wherein said third member is a direct connection between said ring gear of said third planetary gear assembly and said sun gear of said fourth planetary gear assembly.

18. The automatic transmission of claim 15 wherein said first member is a direct connection between said ring gear of said first planetary gear assembly and said sun gear of said second planetary gear assembly and said third member is a direct connection between said ring gear of said third planetary gear assembly and said sun gear of said fourth planetary gear assembly.

19. The automatic transmission of claim 15 further including a housing and wherein said brakes include an element connected to said housing.

20. The automatic transmission of claim 15 wherein said brakes and said clutches include first and second interleaved pluralities of friction discs.

* * * * *